United States Patent [19]

Leemkuil et al.

[11] Patent Number: 4,798,275

[45] Date of Patent: Jan. 17, 1989

[54] LINE-SHAFT CONVEYOR DIVERTER

[75] Inventors: Hendrik Leemkuil, Pickerington; Robert E. Slyh, Jr., Mt. Sterling, both of Ohio

[73] Assignee: Versa Corporation, Mount Sterling, Ohio

[21] Appl. No.: 879,993

[22] Filed: Jun. 30, 1986

[51] Int. Cl.⁴ .......................................... B65G 47/53
[52] U.S. Cl. ................................. 198/372; 198/367; 198/457; 198/809
[58] Field of Search ............... 198/372, 369, 367, 586, 198/457, 809

[56] References Cited

U.S. PATENT DOCUMENTS

| | | | |
|---|---|---|---|
| 859,595 | 7/1907 | Camp | 198/371 |
| 1,980,261 | 11/1934 | Fenton . | |
| 2,942,718 | 6/1960 | Buhrer | 198/372 |
| 3,018,873 | 1/1962 | Burt | 198/809 X |
| 3,104,004 | 9/1963 | Poel et al. . | |
| 3,191,747 | 6/1965 | Pollard | 198/367 |
| 3,303,923 | 2/1967 | Davis . | |
| 3,456,773 | 7/1969 | Titmas, Jr. . | |
| 3,680,692 | 8/1972 | Southworth . | |
| 3,983,988 | 10/1976 | Maxted et al. . | |
| 4,256,222 | 3/1981 | Gunti | 198/367 X |
| 4,264,002 | 4/1981 | Van Der Schie | 198/365 |
| 4,328,889 | 5/1982 | Maxted . | |

FOREIGN PATENT DOCUMENTS

2728016  1/1979  Fed. Rep. of Germany ...... 198/457
75318    6/1981  Japan .................................. 198/369

*Primary Examiner*—Hoang G. Dang
*Attorney, Agent, or Firm*—Litman, McMahon & Brown

[57] ABSTRACT

A diverter assembly is provided for preferential use with a line-shaft powered roller conveyor. The diverter assembly includes a diverter mechanism having a plurality of transfer loops thereon which may be recessed between rollers of the main conveyor or raised thereabove during diversion. The transfer loops are oriented for diversion generally transversely of a path of conveyance of the main conveyor. The diverter mechanism, including the transfer loops, is mounted upon a frame lift portion of the assembly which moves during selected actuation through a vertical, arcuate pathway relative to a line-shaft in the main conveyor. Rotational power for the transfer loops is derived from the line-shaft of the main conveyor. This is achieved by means of a powered drive wheel mounted on the line-shaft and a power transfer wheel mounted in the frame lift portion. As a result of the arcuate motion of the frame lift portion, a distance between the drive wheel and the transfer wheel is maintained constant, during assembly use. Advantages achieved from this include no substantial stretching of belt members and no requirement for a complex, movable idler adjustment mechanism.

19 Claims, 2 Drawing Sheets

LINE-SHAFT CONVEYOR DIVERTER

BACKGROUND OF THE INVENTION

The present invention relates to conveyors and in particular to diverters for use with conveyors. Specifically, the invention concerns a diverter usable with a line-shaft powered roller conveyor, the diverter being usable to divert objects at a right angle from the main conveyor.

Diverters of many types are well known to the conveyor art. A general characteristic of the one of concern herein is that a transfer mechanism, such as a group of transfer belts, is recessed beneath a transfer surface of the main conveyor when diversion is not desired, the transfer mechanism being raisable above the surface of the main conveyor to engage objects when diversion is intended. Arrangements meeting the above general description are known, and it is the mechanism by which the instant arrangement operates that is unique, in part due to its ability to compensate for problems in prior devices and also for its versatility.

In some conventional diverters, wherein rollers or belts are raised above a conveying surface of a main conveyor, the transfer belts, or the belts used to power rollers if diverter rollers are involved, are stretched during the raising or lowering. This can cause stress to the belts, with increased chance for failure. Further, it can create difficulties in controlling the rate of speed of the diverting rollers.

Many past devices have involved transfer belts or rollers which are mounted in a frame system in such a manner that when they are raised they are also tilted somewhat. That is, an end of the diverter on one side of the conveyor is raised higher than the end at the other side of the main conveyor during diverter operation. This may be inefficient and may cause tilting of objects being diverted which may be undesirable in certain instances. Generally, conventional devices have not satisfactorily solved the problem of having vertical lift with no substantial tilting and without stretching of the transfer belts or drive belts for diverter rollers.

A continual source of problem in conventional systems has been with the provision of adequate power means for the diverter. In some systems a motor or drive mechanism that is independent of the drive mechanism for the main conveyor is used. This requires additional equipment and an increased need for maintenance which increases both the cost and the risk of failure. In some systems it has been found preferable to utilize power derived from the main conveyor itself. In particular, when the main conveyor s a line-shaft powered roller conveyor, the line-shaft is available for powering a diverter if the diverter is of appropriate design.

A problem with using power derived from a main line-shaft in a line-shaft conveyor for a diverter assembly, wherein transfer belts or rollers are raised or lowered with respect to a conveying surface of the main conveyor, has been generated by the fact that while the diverter rollers or belts are raised or lowered, the line-shaft remains stationary. Thus, with conventional systems a drive belt or drive mechanism providing engagement between the diverter and the line-shaft would have to compensate for the relative movement of portions of the diverter with respect to the line-shaft. In the absence of the present invention this would generally require either complex movable idler arm adjustment arrangements or drive belts which stretch. Again, such systems may: require increased maintenance, be expensive, be relatively complicated; be difficult to assemble, and be prone to failure. Further, with such systems it may be difficult to control the rate of speed of the diverter relative to the main conveyor, which is important for ensuring smooth operation.

Generally, conventional diverters are suitable for diversion in one direction only. That is, they are generally assembled for diversion from only one side of a conveyor, i.e., either the right side or the left side. For many such systems switching for operation in an opposite direction is difficult. This is especially true for diverters wherein the diverter not only vertically lifts when objects are engaged but also tilts.

A problem with diverters deriving their power from the main conveyor, such as from a line-shaft in a line-shaft powered conveyer, has been that the line-shaft generally rotates at a fixed, constant rate of speed. Thus, adjustment in the speed of the action of the transfer belts or rollers in the diverter has, in the past, been difficult. In many instances, for many conventional systems, adjustment is not readily possible.

In addition, conventional diverters may have a multitude of moving parts and may need to be manufactured to fine tolerances for operation, both of which will tend to increase the cost of such systems. Generally, it is desirable to produce a diverter system which is not only well adapted for nearly universal application but which is also relatively inexpensive to build and operate by comparison to most conventional systems. Further, it is preferable that such a system be constructed to permit relatively easy access for maintenance and, further, that the design be such as to be relatively free from problems of failure during use.

OBJECTS OF THE INVENTION

Therefore, the objects of the present invention are to provide a diverter or diverter assembly especially suited for diverting objects from a conveying surface of a main conveyor; to provide such a diverter assembly particularly well suited for use in diverting objects at a right angle to a path of conveyance of the main conveyor; to provide such a diverter assembly including a diverting mechanism which provides lift for objects on the main conveyor during diversion without substantial tilting; to provide such a diverter assembly wherein the diverting mechanism may be powered by the main conveyor; to provide such a diverter assembly particularly adapted for use with a line-shaft powered roller conveyor, wherein power for the diverting mechanism may be derived from the main conveyor line-shaft; to provide such a diverter assembly in which power may be derived from the main conveyor line-shaft by means of a belt or loop arrangement which does not stretch during diversion and which does not require a substantial movable idler arm adjustment assembly for maintaining tension on the belt or loop; to provide such a diverter assembly which may be relatively readily adjusted for diversion in either a first direction or a second, opposite, direction; to provide such a diverter assembly in which a rate of transfer speed of the diverter mechanism may be relatively easily adjusted; to provide such a diverter assembly characterized by having a stationary frame portion and a frame lift portion with a diverter mechanism mounted in the frame lift portion and deriving power from a powered drive wheel mounted in the stationary frame portion; to provide such a diverter assembly wherein the diverter mechanism includes a power transfer wheel that is mounted in the frame lift portion and engages the powered drive wheel by means of a drive loop that does not substantially stretch or adjust in length during operation of the assembly; to provide such a diverter assembly in which a distance between the power transfer wheel and the powered drive wheel is maintained substantially constant during raising or lowering of the frame lift portion; to provide such a diverter assembly in which the diverter mechanism is characterized by having at least one transfer loop supported by a plurality of rollers and in which the transfer loop may be of either a belt or chain type that does not stretch substantially during diversion; to provide an assembly including a plurality of transfer loops mounted in a generally parallel relationship to one another; to provide such a diverter assembly including reversing means selectively enabling each transfer loop to be driven in a first diverting direction and, alternatively, in a second, opposite, diverting direction; to provide such a diverter assembly in which the reversing means includes a pair of rollers that are laterally spaced with respect to one another and which are pivotable about generally parallel axes, the transfer loop being adjustable to engage the rollers for drive in a first direction and the transfer loop being selectively re-adjustable with respect to the rollers for drive in a second, opposite, direction; to provide such a diverter assembly in which a rate of speed of the transfer loop may be selectively and relatively easily adjusted; to provide such a diverter assembly which is relatively inexpensive to produce; to provide such a diverter assembly which is relatively easy to manufacture, simple to use, and which is particularly well adapted for the proposed usages thereof; to provide such a diverter assembly in combination with a main conveyor; to provide such a combination involving the diverter and a main conveyor of a line-shaft powered type; and to provide such a combination which is relatively inexpensive to assemble and maintain.

Other objects and advantages of this invention will become apparent from the following descriptions taken in connection with the accompanying drawings wherein are set forth by way of illustration and example certain embodiments of this invention.

SUMMARY OF THE INVENTION

A diverter or diverter assembly is provided for engaging objects moving along a main conveyor and diverting the objects from the main conveyor. The diverter assembly is particularly well adapted for diverting objects at a right angle to a path of conveyance of the main conveyor; however, it may be adapted for other applications.

For the preferred embodiment, the main conveyor is a roller conveyor comprising a plurality of transverse, parallel rollers, each of which is powered by means of an elongate line-shaft that extends perpendicularly to the main conveyor rollers. At a location in the main conveyor where diversion is required, the diverter assembly is mounted with diverting portions extending between some of the main conveyor rollers.

In general, the diverter assembly includes a stationary portion and a lift portion. The stationary portion includes a frame or frame means wherein certain portions of the diverter assembly are mounted. The stationary frame portion may include part of, or be integral with, portions of the main conveyor frame.

In the preferred embodiment the lift portion is mounted upon the stationary portion and is at least vertically movable relative thereto. The frame lift portion includes a diverter mechanism which, when lifted, can engage objects on the main conveyor and divert the objects from the main conveyor to side conveyors, storage locations, work stations, or the like.

The preferred diverter mechanism includes at least one transfer loop which may be raised or lowered with respect to the main conveyor. The transfer loop(s) may, for example, be a friction belt or a chain supported by rollers mounted in the frame lift portion. In the preferred embodiment, the transfer loop(s) is rotated in a direction transverse to the motion of objects along the main conveyor, at least for the preferred direction of diversion of the preferred embodiment. Thus, when the objects are engaged by the transfer loop(s), they are preferably transferred at right angles to the main conveyor.

A substantial component of momentum imparted by the main conveyor is avoided by having the transfer loop(s) mounted for lifting of the objects above the surface of the main conveyor as the objects are diverted. The transfer loop(s) may be oriented to transfer objects at an angle other than a right angle with respect to the main conveyor. However, the invention is particularly well adapted for right angle transfer.

Preferably, in operational combination with a main conveyor according to the preferred embodiment, the diverter assembly includes a plurality of transfer loops extending generally parallel to one another and spaced apart a total distance less than the length of the objects to be diverted. That is, an object being diverted is lifted by more than one transfer loop operating in cooperation to provide relatively secure lifting and diverting.

For the preferred embodiment, each transfer loop(s) is powered by a drive means including a powered roller mounted in the frame lift portion. Preferably, an idler roller operates in association with each powered roller to enable the transfer loop(s) to be mounted in first and second configurations. This will be generally referred to herein as a reversing means, permitting each transfer loop to be operated in either of two configurations. In the first configuration each transfer loop engages the powered roller for rotation in a first diverting direction. In the second configuration each transfer loop engages the powered roller for rotation in a second, opposite, diverting direction. Thus, the same diverter assembly may be readily adjusted for transfer in either of two opposite directions with respect to the main conveyor. In this manner, the diverter assembly is relatively universal in construction and operation. In part, this is facilitated by the fact that the diverter mechanism is not substantially tilted as it is raised and further by the fact that it also does not substantially tilt objects being diverted. Rather, the diverter mechanism is lifted vertically but without substantial tilting. It is, however, noted that the diverter mechanism is moved laterally somewhat during lifting as the result of a preferred linkage mechanism, described below, that is used for lift.

It is a particular advantage of the present invention that power for the driving of the transfer loop or loops in the diverter mechanism may be derived from the line-shaft of the main conveyor. This avoids a plurality of motors and provides that the transfer loop or loops may be constantly driven so that there will be relatively few problems from power loss or power surges during clutching in or clutching out of the diverter.

For the preferred embodiment, a drive wheel is mounted upon the stationary frame portion of the diverter assembly. When the power is to be derived from the line-shaft, the powered drive wheel is preferably a wheel mounted directly on the main conveyor line-shaft. The powered drive wheel does not move vertically during operation of the diverter assembly.

In the preferred embodiment, a drive shaft is mounted in the frame lift portion to extend generally parallel to the main conveyor line-shaft. The drive shaft comprises a portion of the drive means and includes a power transfer wheel thereon which is appropriately aligned with respect to the powered drive wheel on the line-shaft to be driven thereby. Preferably the driving force is transferred by means of a continuous drive loop comprising either a friction belt or a chain extending around both the transfer wheel and the line-shaft powered drive wheel.

Rotation of the drive shaft in the frame lift portion by means of the line-shaft provides drive for the diverter mechanism and generates the selected diversion. Generally, for the preferred embodiment, the diverter mechanism includes a plurality of laterally spaced, substantially parallel transfer loops which are driven by a plurality of drive rollers mounted on the drive shaft. Each transfer loop, as indicated above, preferably comprises a continuous belt or chain supported by rollers in the frame lift portion. As the frame lift portion is vertically lifted or lowered, the transfer loops are selectively moved into and out of an orientation wherein they may engage objects on the main conveyor and divert same.

As indicated above, the main conveyor line-shaft and the powered drive wheel are mounted in a portion of the apparatus which is stationary with respect to vertical movement. The transfer wheel, on the other hand, is mounted in a portion of the diverter assembly which raises and lowers, that is, the frame lift portion. In order to both prevent a stretching of the drive loop and eliminate a need for a complicated movable idler adjustment system for keeping the drive loop taut, the diverter assembly includes a preferred lift means that moves the frame lift portion through an arc or arcuate path when the frame lift portion is moved relative to the stationary frame portion. The result of the preferred arc motion is that a constant distance is maintained between the transfer wheel and the powered drive wheel during operation of the assembly. The system also avoids transfer loops or diverter roller belts which stretch or might alternately become slack or taut during operation.

Generally, a frame lift means moves the frame lift portion between first and second extremes. In the first extreme, a lowered position, the diverter mechanism is recessed with the transfer loop or loops being received beneath an article conveying surface of the main conveyor. In the second extreme position, a raised position, the diverter mechanism is raised with an upper surface of the transfer loop or loops raised above the article conveying surface of the main conveyor. In the second position articles upon the conveyor may be engaged and lifted, with the transfer loops being operable to generate selected diversion. Preferably the upper surface of each transfer loop is substantially horizontal so objects are not substantially tilted when lifted.

In the preferred embodiment the lift mechanism includes a linkage system that not only provides for the vertical lift but also provides for the preferred arcuate motion that maintains the desired distance between the line-shaft powered drive wheel and the transfer wheel. Generally, the linkage system utilizes first and second pairs of link members which act in cooperation to both lift and laterally move the diverter mechanism. Each link member, for the preferred embodiment, is generally rectangular and has a first pivot point by which it is mounted in the stationary frame portion of the diverter assembly and a second pivot point by which it is attached to the frame lift portion of the assembly. The pivot points are appropriately positioned with respect to one another so that pivoting about the first pivot point generates both vertical and lateral movement of the second pivot point, i.e. an arcuate motion. Actuating means for the two pairs of pivoting link members may be any of a variety of conventional methods including, for example, a hydraulic or pneumatic piston and cylinder assembly used in association with an appropriate connecting linkage.

The drawings constitute a part of the specification, include exemplary embodiments of the present invention, and illustrate various objects and features thereof. It is noted that in some instances material thicknesses may be shown somewhat exaggerated for clarity.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but rather merely as a basis for the claims and as a representative basis for teaching one skilled in the art to variously employ the present invention in virtually any appropriately detailed structure.

Figure 1:
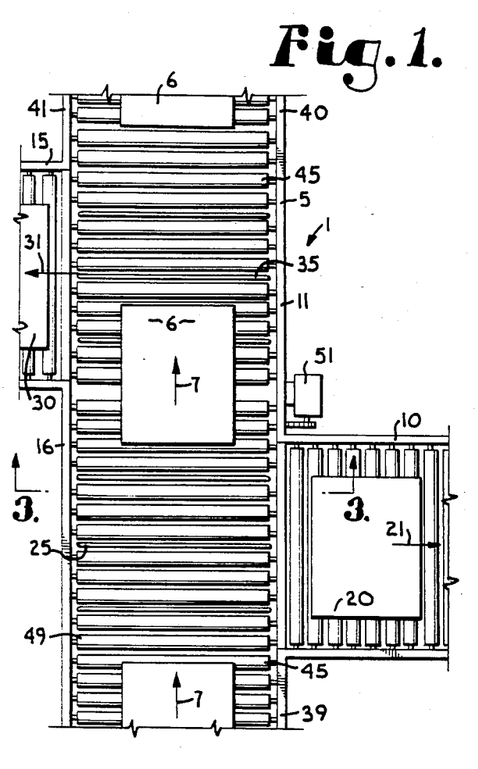
FIG. 1 is a fragmentary top plan view of a conveyor system having a main conveyor and first and second diverter assemblies, according to the present invention, depicted in association with side conveyors.

The reference numeral 1, FIG. 1, generally indicates a conveyor system utilizing a pair of diverter assemblies according to the present invention. In FIG. 1 a main conveyor 5 is shown with boxes 6 being transferred thereon in the direction of arrows 7. A first side or spur conveyor 10 is shown intersecting the main conveyor 5 along a first side 11 thereof. Similarly a second side or spur conveyor 15 engages a second side 16 of the main conveyor 5.

Diverter mechanisms according to the present invention are used to selectively divert objects from movement along the main conveyor 5 in the direction of arrows 7, to movement in a generally transverse direction, shown in FIG. 1 as transfer to one of the side conveyors 10 and 15. In FIG. 1, a box 20 is shown having been transferred onto side conveyor 10 for conveyance in the direction of arrow 21; the transfer having been generated by a first diverter assembly 25 positioned in the main conveyor 5.

Also in FIG. 1, a box 30 is shown having been transferred onto conveyor 15 for conveyance in the direction of arrow 31. Box 30, it will be understood, has been transferred onto conveyor 15 by means of a second diverter assembly 35 appropriately positioned. Comparison of side conveyors 10 and 15 generates an understanding that a diverter assembly according to the present invention may be used to divert articles off either side of a main conveyor. That is, with very little exception generally the first diverter assembly 25 may be substantially identical to the second diverter assembly 35 but for a minor change made to accommodate a different direction of transfer of articles. This will become more apparent from the further detailed description and the remainder of the drawings.

Referring again to FIG. 1, for the preferred embodiment the main conveyor 5 is a roller conveyor having a frame system 39 including first and second side supports 40 and 41, between which a plurality of rollers 45 extend. Generally the rollers 45 extend parallel to one another and provide an upper article conveying surface 49 upon which articles such as boxes 6 may be transferred. Generally, such roller conveyors are well known and are suitable for almost universal use.

Figure 2:
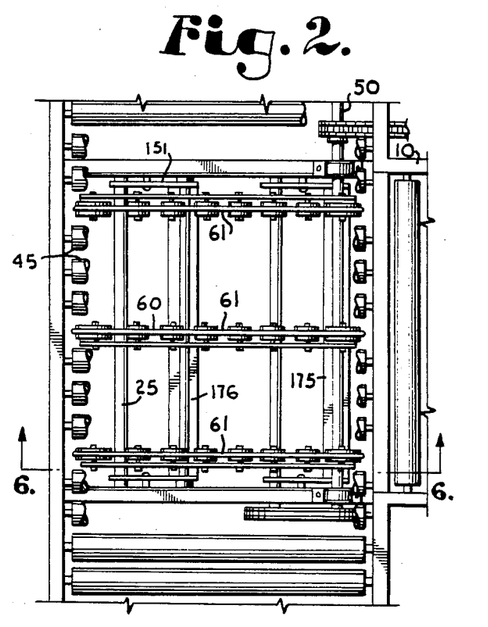
FIG. 2 is a somewhat enlarged fragmentary top plan view of a portion of the system shown in FIG. 1, with portions broken away to show internal detail.
Figure 4:
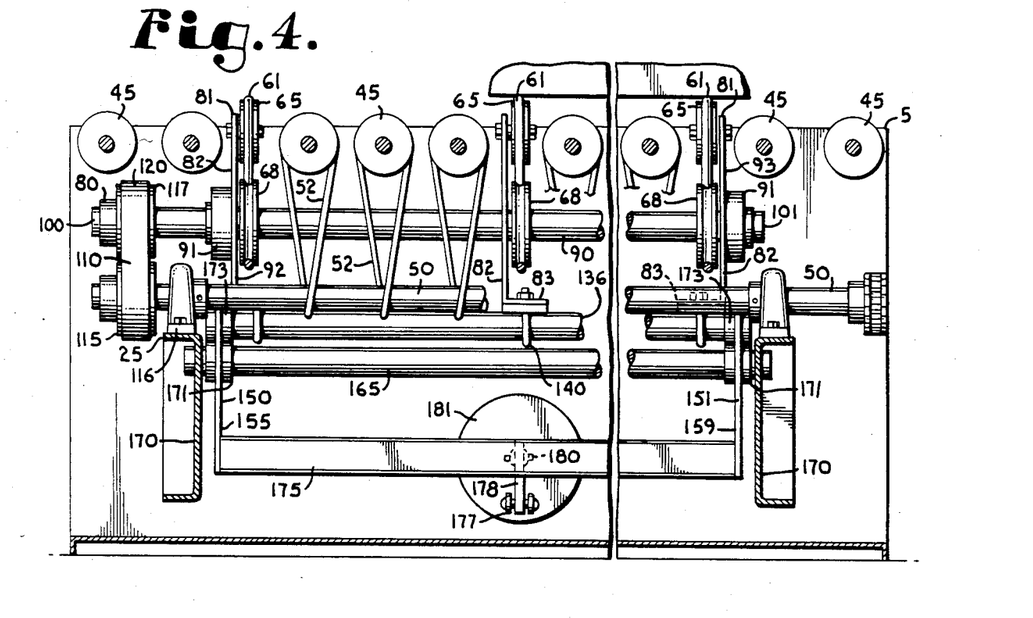
FIG. 4 is an enlarged fragmentary, side cross-sectional view taken generally along line 4—4 of FIG. 3 with portions broken away to show detail.

Referring to FIGS. 2 and 4, in the preferred embodiment generally the main conveyor 5 is a line-shaft driven roller conveyor wherein the rollers 45 are continually rotated by means of a line-shaft 50 that extends generally perpendicularly to the rollers 45. In such systems generally the line-shaft 50 is continuously powered by motor means 51, FIG. 1, with rotational momentum being transferred to each roller 45, from the line-shaft 50, by means of belts 52. In FIG. 4 several belts 52 are shown communicating between the line-shaft 50 and certain of the rollers 45. It will be understood that each roller 45 which is powered has a similar belt 52 associated therewith even though not all necessary belts are shown in the drawing.

Referring again to FIG. 1 the line shaft 50, not viewable, generally is used to power the rollers 45 so that they are simultaneously rotated in a manner enabling transfer of boxes 6 therealong in the direction of arrows 7, at a constant speed.

Generally the diverter assembly operates by means of a diverter mechanism which can be raised into engagement with articles such as boxes 6 moving along the main conveyor 5. When the diverter mechanism engages the articles, it lifts them off of the main conveyor and directs them toward a selected location, such as spur conveyors 10 and 15. Preferably the diverter mechanism operates by rising up underneath a selected article to be diverted, lifting same.

Referring to FIG. 2, the diverter assembly 25 is shown somewhat detailed.

Diverter assembly 25 includes a diverter mechanism 60 which may be raised or lowered, as selected, for diverting. In the preferred embodiment the diverter mechanism 60 includes at least one, and preferably a plurality of, transfer means such as loops 61. The transfer loops 61 extend generally parallel to one another and transversely of the path of conveyance 7 of the main conveyor 5. The transfer loops 61 each include an upper surface 62, FIG. 6, which may engage and lift an object to be diverted. Generally, during diversion all of the transfer loops 61 are operated at a constant rate of speed to move their upper surfaces 62 in the general direction of diversion. Thus, an object resting upon the transfer loops 61 will be selectively diverted. Preferably the upper surfaces 62 of the transfer loops 61 are supported generally horizontally, so that lifted objects are not substantially tilted, and so that transfer in either direction is facilitated.

Referring to FIGS. 1 and 2, the upper surfaces 62 of each of the transfer loops 61 will, selectively, be moved in the direction of arrow 21, FIG. 1, for diversion to spur conveyor 10. It will be understood that a selected spacing between the transfer loops 61 will be such as to accommodate objects of a size anticipated to be moved along the main conveyor 5. Thus, a wide variety of spacings may be used. Also, a substantially varied number of means such as transfer loops 61 may be used in various embodiments of the present invention.

As will be understood from the further detailed description, generally the transfer means 60 is mounted so that it may be raised and lowered between selected rollers 45 in the main conveyor 5. In some instances it may be desirable to remove selected rollers, when a diverter assembly having transfer means such as loops 61 located therein is positioned in the conveyor 5. In other instances and applications, especially where permanent positioning of a diverter assembly is contemplated, the main conveyor may be provided with an extra spacing between certain selected rollers where the transfer loops 61 are to be located.

Herein the term "diverter assembly" will be used to generally refer to the entire assembly that generates selective diversion of articles or objects from the main conveyor. On the other hand, the term "diverter mechanism" or "diverter means" will be used to refer to the portion of the assembly which raises and lowers to engage objects and divert same. Specifically, the diverter mechanism of the preferred embodiment includes transfer loops such as transfer loops 61 positioned in diverter assembly 25. The term "diverter drive means" generally refers to the mechanism and power source for the diverter mechanism.

Figure 3:
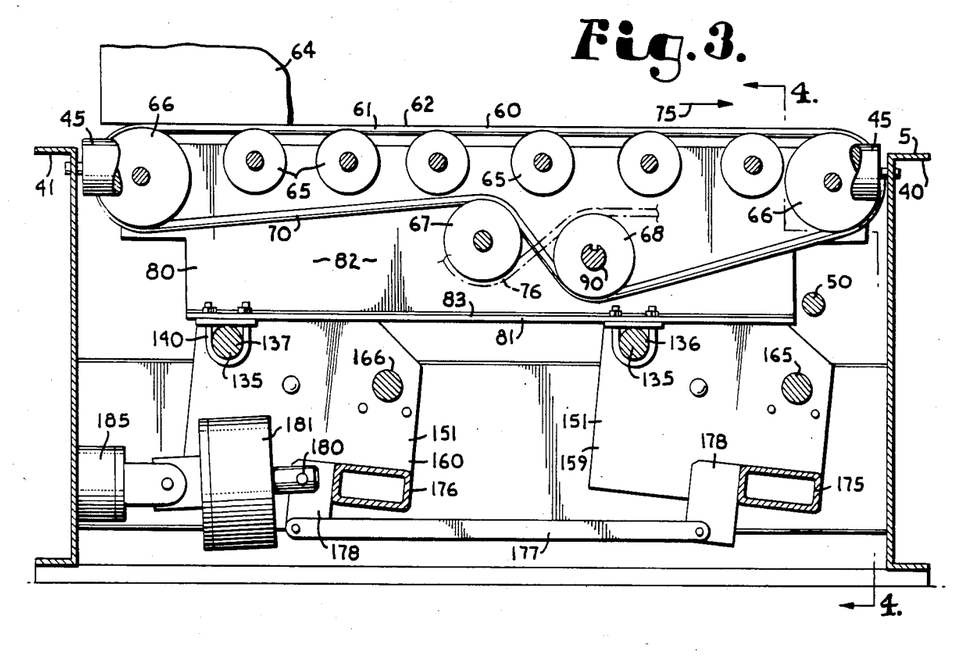
FIG. 3 is an enlarged fragmentary side cross-sectional view taken generally along line 3—3 of FIG. 1 and with portions broken away to show detail, a raisable portion of the system being shown in a raised orientation, to divert an article pictured on the assembly.
Figures 5, 6:
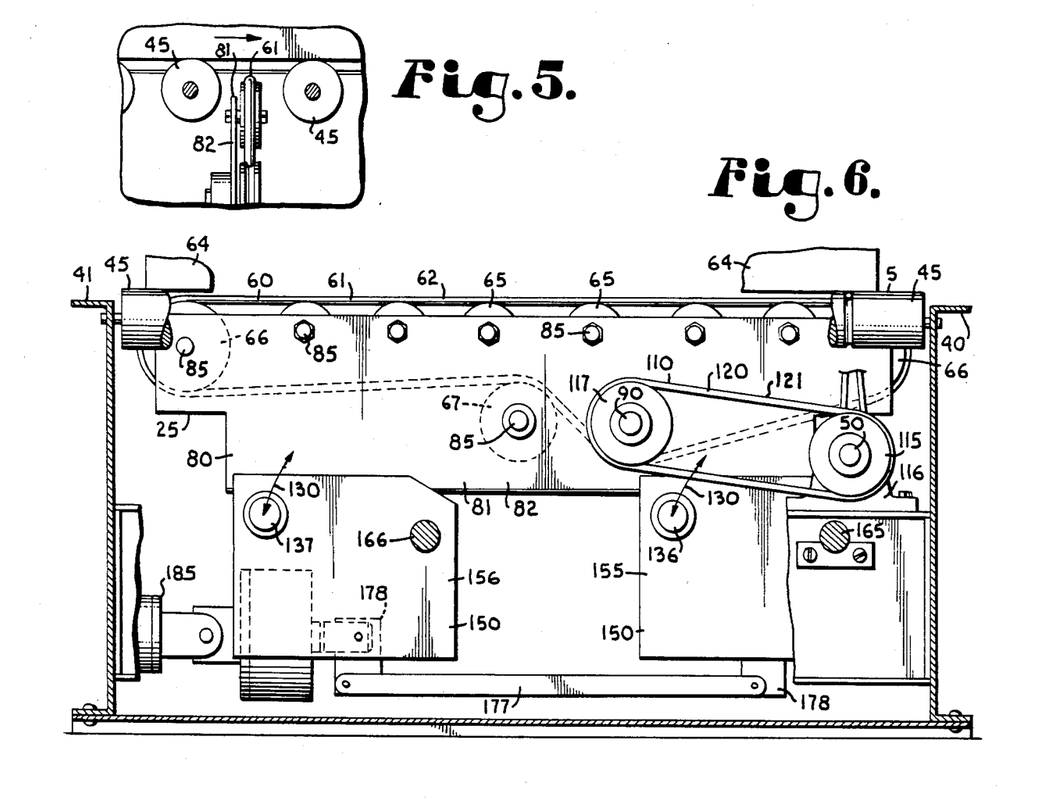
FIG. 5 is an enlarged fragmentary side view of a portion of the apparatus depicted in FIG. 4. positioned in an alternative orientation relative thereto.
FIG. 6 is an enlarged side fragmentary cross-sectional view taken generally along line 6—6 of FIG. 2 and showing a portion of the diverter assembly in a lowered orientation.

In FIG. 6 diverter assembly 25 is pictured with its diverter mechanism 60 appropriately recessed so that objects moving along the main conveyor 5 will not be diverted. In particular diverter mechanism 60 is shown recessed so that it does not engage box 64 rather the box 64 rests upon rollers 45. The rollers 45, again, are being powered by line-shaft 50 to convey the box 64. In FIG. 3 the diverter assembly 25 is shown with the diverter mechanism 60 raised for article diversion.

Referring to FIG. 3, each transfer loop 61 is mounted upon a plurality of cooperating rollers including support rollers 65, end rollers 66, idler roller 67 and drive roller 68. Generally the transfer loop 61 may be of a variety of types including, for example, a friction belt 70, such as is shown in the drawings, or a continuous chain, not shown.

Generally, drive roller 68 is powered by means described below. Engagement between the drive roller 68 and the belt 70 generates movement of belt 70, that is, movement of the transfer loop 61. Idler roller 67 is used to appropriately orient the loop 61 or belt 70, where it engages the drive roller 68. Support rollers 65 support the belt 70 along an upper edge where objects such as object 64 are engaged. End rollers 66 are used to support the continuous loop 61 or friction belt 70 substantially near opposite sides of the main conveyor 5.

Referring to FIG. 3, the diverter means or mechanism 60 is shown generally oriented for transfer of object 64 in the direction of arrow 75, assuming the line-shaft 50 is operated for clockwise rotation of drive roller 68. If desired, the diverter mechanism 60 may be adjusted for diverting motion in an exactly opposite direction, while the drive roller 68 is rotated in the same clockwise, manner. This is illustrated by the phantom line depiction of a position of a transfer loop 76 in FIG. 3. That is, adjustment of direction of movement of the loop 61 is a matter of appropriate orientation with respect to the idler roller 67 and the drive roller 68. In the phantom line depiction of loop 76, since the loop 76 engages the drive roller 68 on an opposite side thereof from the side engaged by loop 61 in solid lines, rotation of drive roller 68 in a clockwise manner will result in rotation of loop 76 in a direction opposite to that shown for loop 61. That is object 64 would be diverted in a direction opposite to that of arrow 75.

To accomplish this, the idler roller 67 and drive roller 68 are oriented laterally spaced with substantially parallel axes of rotation. Each is provided with an upper edge and a lower edge. For the embodiment shown, diversion in the direction of arrow 75 is accomplished by having the loop 61 pass over the upper edge of the idler roller 67 and under the lower edge of drive roller 68. Rotation of loop 61 in the opposite direction is accomplished by passing the loop 61 under the idler roller 67 and over the upper edge of the drive roller 68.

Herein the term "reversing means" generally refers to a mechanism enabling a transfer loop to be operated in first and second opposite directions when powered by a drive roller or shaft that may be rotated in the same direction for either direction of motion for the transfer loop. In the preferred embodiment the reversing means generally comprises an appropriately cooperating and appropriately positioned idler roller 67 and drive roller 68. Generally, the idler roller 67 and drive roller 68 will include rotation axes which are substantially parallel to one another, with the rollers being laterally spaced and preferably generally oriented as shown in FIG. 3.

Referring to FIG. 6, the rollers 65, 66, and 67 are generally mounted upon a frame lift portion 80 which, preferably, includes a plurality of angle members 81, FIG. 4, that are mounted in the assembly 25. Each angle member 81 includes a vertical extension 82 and a lower horizontal extension 83.

Referring to FIG. 6, a set of rollers 65, 66, and 67, which cooperate to support a single transfer loop 61 are mounted upon a vertical extension 82 of one of the angle members 81 by means of axles 85. Referring to FIGS. 3 and 4, a similar set of rollers for each loop 61 is mounted upon each of the plurality of spaced angle members 81.

The frame lift portion 80, FIG. 4, includes an elongate drive shaft 90 rotatably mounted therein. Generally, drive shaft 90 extends transversely of the transfer loops 61 and angle members 81. For the preferred embodiment, the drive shaft 90 extends generally parallel to the main conveyor line-shaft 50.

Drive shaft 90 is rotatably mounted in the frame lift portion 80 by means of bearings 91 mounted in end angles 92 and 93. A drive roller 68 for each transfer loop 61, or belt 70, FIG. 4, is mounted upon the drive shaft 90. Thus, as the drive shaft 90 is rotated, each transfer loop 61 is driven.

Again referring to FIG. 4, the drive shaft 90 includes a first end 100 and a second end 101. In the preferred embodiment means for rotating the drive shaft 90 are oriented substantially near the first end 100 thereof. Referring to FIGS. 4 and 6, this is provided by means of a drive loop assembly 110.

Referring to FIG. 6, the drive loop assembly 110 comprises a powered drive wheel 115 mounted in a stationary frame portion 116 of the diverter assembly 25. In the preferred embodiment, FIG. 6, powered drive wheel 115 is mounted upon the line-shaft 50 of the main conveyor 5. Generally, powered drive wheel 115 does not move vertically as the frame lift portion 80 of the diverter assembly 25 is raised and lowered.

The drive loop assembly 110 also includes a power transfer roller 117 mounted upon drive shaft 90. Preferably transfer roller 117 is appropriately aligned with powered drive wheel 115 for communication by means of a drive loop 120, FIG. 4.

In the embodiment shown the drive loop 120 comprises a friction belt 121 which extends around the two rollers 115 and 117. Thus, as powered drive wheel 115 is rotated the transfer roller 117 is driven, driving the shaft 90 and ultimately the transfer loops 61. It is noted that the drive loop 120 need not be a friction belt such as belt 121. For example, a chain drive or timing belt might be used, with appropriate adaptations.

It is noted that the power transfer roller 117 is mounted in the frame lift portion 80 of the assembly 25. However, the powered drive wheel 115 is mounted in the stationary frame portion 116, that is, a portion of the assembly 25 which does not raise or lower during use. Thus, as the diverter assembly 25 is operated, the power transfer roller 117 moves vertically with respect to the powered drive wheel 115. In the absence of means to accommodate this vertical movement, the movement would result in either a stretching or breaking of a taut drive loop 120.

It is a particularly advantageous feature of the present invention that movement of the power transfer roller 117 relative to the powered drive wheel 115 is readily accommodated without the need for stretching of either the drive loop 120 or the transfer loops 61 and without the need for a complex movable idler mechanism which could be used to adjustably take up slack in a loose loop. Generally, the desired result is obtained by maintaining a substantially constant distance between the rotation axes of the transfer roller 117 and drive wheel 115 during vertical movement. This, it will be readily understood, requires an arcuate movement of the lift portion 80, during lift, along the general path of double-headed arrows 130, FIG. 6. That is, as roller 117 is vertically moved, it is also moved laterally with its total motion being described as being about an arc of a circle having a radius substantially equal to the distance between the axis-of-rotation of the powered drive wheel 115 and the axis-of-rotation of the transfer roller 117. Thus, the drive loop 120 is not placed under substantial additional lateral stress during a lifting operation of the assembly 25.

Before describing the lift means and arc movement means or mechanism enabling the preferred motion of the power transfer roller 117 with respect to the powered drive wheel 115, reference will be made to means permitting variation in a speed of rotation of the transfer loop 61.

It will be readily understood that the rate of movement of the transfer loop 61 depends primarily upon the rate of rotation of transfer wheel 117. Thus, the rate of movement of the transfer loop 61 can be readily adjusted by varying the rate at which roller 117 is rotated. In the preferred embodiment roller 117 is ultimately driven by the line-shaft 50, which typically rotates at a constant rate for the main conveyor. Thus, varying the rate of rotation of roller 117 is a matter of varying the gear ratio between the powered drive wheel 115 and roller 117. This can be accomplished, for example, by changing the size of the wheel 115 that is mounted upon the line-shaft 50 or the size of roller 117. It is noted that a variance in the size of wheel 115 or roller 117 might require a change in the drive loop 120. From the above description it is readily seen that the assembly 25 can be easily adapted for a variety of selected speeds of operation for the transfer loops 61.

The mechanism enabling vertical and lateral movement of the frame lift portion 80 is understood by reference to FIGS. 3, 4, and 6. Referring to FIG. 3 each angle member 81 in the frame lift portion 80 is preferably mounted upon a pair of lift axles 135 comprising a front axle 136 and a rear axle 137. In the preferred embodiment, axles 136 and 137 extend generally parallel to one another, generally parallel to the drive shaft 90, and generally transversely of the path of movement for the transfer mechanism comprising transfer loops 61. Also in the preferred embodiment, each angle member 81 is attached to axles 136 and 137 by means of U-clamps 140. Referring to FIG. 4, the claps 140 are attached to the horizontal parts 83 of the angle members 81 in a conventional manner.

By reference to FIGS. 3 and 4, it will be understood that each of the plurality of angle members 81 is similarly mounted upon the pair of axles 135, although by reference to the end angles 92 and 93, it will be further understood that the horizontal portions of the angles need not project in the same direction.

Referring to FIG. 6, the desired motion of the frame lift portion 80 is accomplished by movement of the pair of axles 135 in cooperation along the general path indicated by the double-headed arrows 130, that is, along an appropriate arc to create the needed lift for the transfer mechanism and the needed arcuate movement for the drive loop assembly 110.

Generally, for the preferred embodiment, the lift and pivoting motion is controlled by four links. Referring to FIG. 6, the four links comprise a first pair of links 150 mounted generally at one end of the assembly and a second pair 151, FIG. 3, mounted at an opposite end.

Referring to FIG. 6, wherein the first pair of links 150 is pictured, each pair of links include a front link and a rear link. For the pair of links 150 depicted in FIG. 6, this is front link 155 and rear link 156. Referring to FIG. 3, wherein the second pair of links 151 is depicted, front and rear links 159 and 160, respectively, are pictured. These links are generally analogous in operation to links 155 and 156.

Operation of the links to generate vertical and lateral movement of the frame lift portion 80 is understood by reference to FIGS. 3 and 4. Referring to FIG. 3, the diverter assembly 25 includes front and rear pivot axles 165 and 166 therein. Referring to FIG. 4 the axles, for example axle 165 viewable in FIG. 4, are mounted in a stationary portion of the assembly to extend between frame members 170. Generally, the links 150 and 151 are rotatably mounted relative to the frame members 170 by means of bearings 171 or the like. It will be understood that rotational motion between the links and the frame members 170 may be provided, for example, by rotatable mounting of the links on the axles or rotational mounting of the axles on the frame members, as desired. Referring to FIGS. 3 and 4, preferably axles 165 and 166 extend generally parallel to the pair of lift axles 135 and transverse to the transfer loops 61.

Referring to FIGS. 3 and 6, front links 155 and 159 are mounted upon axle 165 in spaced relation to one another, FIG. 4. Similarly, rear links 156 and 160 are mounted upon rear axle 166. In the preferred embodiment, FIG. 4, the front and rear links form pairs of links 150 and 151, each of which includes two links aligned substantially coplanar with respect to one another.

Referring to FIG. 3, each link is also mounted upon an associated one of the lift axles 135. Preferably the engagement between any given link, lift axle 135, and U-clamp 140 is appropriate to permit pivoting of the link with respect to the lifting frame portion 80. This can be accomplished, for example, by having the link be pivotal relative to the axle 135 or having the link and axle be pivotal relative to the clamp 140. In the preferred embodiment, the links are pivotal relative to the axles, pivoting being facilitated, for example, by bearings 173, FIG. 4.

It will be readily understood, by comparison of FIGS. 3 and 6 that, as the links are pivoted, the desired motion of the frame lift portion 80 is accomplished as a result of the relative positions in the links of points for mounting upon axles 165 and 166 and mounting upon the lift axles 136 and 137. Generally, an appropriate actuator linkage system is selected to actuate all of links 155, 156, 159, and 160 simultaneously to generate appropriate synchronized movement of the frame portion 80. The links 155, 156, 159, and 160 of the preferred embodiment are generally rectangular, but for the fact that each has a truncated corner. Preferably, each link or pivot member includes a dimension of vertical extension, that is, a vertical extension portion and a dimension of horizontal extension, i.e., a horizontal extension portion, so that the two pivot points for each link, that is, the points at which the link engages the two associated axles, may be both horizontally and vertically spaced from one another, permitting the desired movement.

Referring to FIGS. 3, 4 and 6, extending between front links 155 and 159 is cross-member 175. Similarly cross-member 176 extends between rear links 156 and 160. Link mechanism 177, FIGS. 3 and 6, communicates between cross-members 175 and 176 by means of ears 178 in a pivotal manner. Thus, as one cross-member is moved, link mechanism 177 generates analogous movement in the other cross-member.

Referring to FIG. 3, one ear 178 includes means such as pin 180 for pivotal engagement by actuator member 181. As the actuator member 181 is moved back and forth, FIGS. 3 and 6, by an actuator mechanism 185, the pairs of links 150 and 151 are pivoted, actuating desired movement of the frame lift portion 80. It will be understood that a variety of types of actuator mechanisms 185 may be used, including hydraulic or pneumatic mechanisms. It will also generally be understood that preferably the actuator mechanisms should include means for stopping and retaining the frame lift portion 80 in either of the raised or the lowered positions, as desired. Further, in some instances it may be desired that for recessing of the frame lift portion 80, the actuator mechanism be provided with a powered return drive, rather than simple reliance on gravity to generate downward movement; this, in part, is due to the requirement for an arcuate movement as well as vertical displacement.

General operation of a diverter assembly according to the present invention in a conveyor system such as system 1 is as follows:

An article 6 is conveyed along the main conveyor 5 until it reaches a point at which the diverter assembly is positioned, and at which diversion is to be accomplished. At this point the main conveyor 5 is braked, to retain the selected article 6 in position for engagement by the diverter assembly. It is noted that, if the speed of the main conveyor 5 is sufficiently slow, braking may not be necessary before diversion.

While the object or article 6 moves along the main conveyor 5, generally the diverter assembly is operably positioned with the diverter mechanism, i.e., the transfer mechanism or loops for the present embodiment, in the lower or recessed position. This is shown, for example, in FIG. 5. When the object to be diverted is appropriately positioned over the diverter assembly, the actuater mechanism 185 is actuated to pivot the pairs of links 150 and 151, raising the frame lift portion 80 and laterally moving same about the arc 130, FIG. 3. This action raises the diverter mechanism or transfer loops 61 into engagement with the object, lifting same.

Generally, whether recessed or raised, the transfer loop 61 is constantly being powered by the conveyor line-shaft 50, through the action of the drive loop assembly 110. Thus, when the transfer loops engage the object 6, the object is propelled transversely of the path of motion 7 of the main conveyor and is diverted in the selected manner, in FIG. 1 to spur conveyor 10 for example. When selected diversion is accomplished, the actuator mechanism 185 is operated to recess the diverter mechanism, i.e., the transfer loops 61.

It will be understood by those skilled in the art that a variety of applications of the present invention may be used. For example, the invention may be used in conveyors not having a line-shaft, but wherein for various reasons it is desirable to have the powered drive wheel 115 mounted on an axle which is in a stationary frame portion of the assembly, that is, an axle which does not vertically or laterally move with the frame lift portion. Further, a variety of types of diverter mechanisms, other than ones utilizing transfer loops 61, might be used. For example, a system utilizing power rollers rather than a continuous transfer loop could be associated with a lift and lateral movement mechanism according to the present invention.

As previously described, the transfer loops 61 comprising belt 70 for the preferred embodiment, FIG. 3, can be oriented for operation in a reverse direction. Referring to FIG. 4, since the transfer loop for one orientation would circumscribe axle 90 but would not in the alternate orientation, in order to make the reversal of direction, it would be desirable for a continuous belt 70 to have axle 90 be removable from the assembly 25. This can be accomplished by conventional means, not detailed. Alternatively, the transfer loop 61 could be made from a chain having a link therein which permits it to be opened and adjusted.

It is to be understood that while certain embodiments of the present invention have been illustrated and described, it is not to be limited to specific forms or arrangement of parts herein described and shown.

What is claimed and desired to be secured by Letters Patent is as follows:

1. A diverter assembly for use with a conveyor to divert objects from a transfer surface of the conveyor; said diverter assembly comprising:
   (a) a stationary frame portion and a portion lift portion;
   (b) diverter means mounted on said frame lift portion;
   (c) a powered drive wheel mounted on said stationary frame portion;
   (d) a power transfer wheel mounted on said frame lift portion;
   (e) drive loop mounted on said powered drive wheel and said powered transfer wheel to transfer power from said power drive wheel to said transfer wheel to rotate same;
   (f) drive means transferring power from said transfer wheel to said diverter means to power same from energy derived from said powered drive wheel;
   (g) said frame lift portion being mounted on said stationary frame portion for vertical movement between a first recessed position and a second diverting position;
      (i) said first position having said diverter means oriented with an upper engagement portion thereof recessed below the transfer surface of the conveyor and out of potential diverting engagement with objects on the conveyor transfer surface;
      (ii) said second position having said upper engagement portion of said diverter means raised above the transfer surface of the conveyor for selected diverting engagement with an object thereon; and
   (h) lift means for selectively moving said frame lift portion between said first and second positions;
      (i) said lift means including arc movement means providing that movement of said frame lift portion occurs along a substantially arcuate path while maintaining a substantially constant distance between said powered drive wheel and said power transfer wheel during arcuate movement;
   (i) whereby an object upon the conveyor transfer surface may be selectively diverted by actuation of said lift means to lift said diverter means into engagement with the object; the object, once engaged, being selectively diverted by means of power derived from said powered drive wheel.

2. A diverter assembly according to claim 1 wherein:
   (a) said diverter means includes at least one transfer loop mounted on a plurality of diverter rollers;
      (i) at least one of said diverter rollers being a powered roller in cooperative engagement with said transfer wheel and said transfer loop to drive said transfer loop when said transfer wheel is rotated; and
   (b) said transfer loop having an outer upper surface laterally movable as said transfer wheel is rotated;
      (i) said outer, upper, surface being substantially horizontal and forming at least a portion of said diverter means engagement portion;

(c) whereby an object on the conveyor transfer surface may be selectively engaged by said transfer loop outer upper surface for lateral movement.

3. A diverter assembly according to claim 2 wherein:
(a) said transfer wheel and said powered roller are co-axially mounted.

4. A diverter assembly according to claim 2 wherein:
(a) said transfer loop is a continuous belt.

5. A diverter assembly according to claim 2 wherein:
(a) said transfer loop is a chain.

6. A diverter assembly according to claim 2 including:
(a) reversing means selectively enabling said transfer loop to be driven in a first diverting direction and also selectively enabling said transfer loop to be driven in a second opposite diverting direction;
(b) whereby said diverter assembly may be adjusted to selectively divert an object in a first direction or a second opposite direction.

7. A diverter assembly according to claim 6 wherein:
(a) said powered roller is substantially vertically oriented for rotation about a substantially horizontal powered roller axis;
(b) said drive means includes an idler roller spaced from said powered roller and rotatable about an axis generally parallel to said powered roller axis; and
(c) said transfer loop is selectively adjustable between a first diverting orientation and a second diverting orientation;
(i) said first diverting orientation having said transfer loop engaging said powered roller and idler roller for powering said transfer loop in said first diverting direction; and,
(ii) said second diverting orientation having said transfer loop engaging said powered roller and idler roller for powering said transfer loop in said second diverting direction.

8. A diverter assembly according to claim 6 wherein:
(a) said powered roller is substantially vertically oriented for rotation about a substantially horizontal axis;
(i) said powered roller having an uppermost edge portion and a lowermost edge portion;
(b) said drive means includes an idler roller laterally spaced from said powered roller and rotatable about an axis generally parallel to said powered roller axis;
(i) said idler roller having an uppermost edge portion and a lowermost edge portion;
(c) said reversing means includes transfer loop adjustment means permitting selective adjustment of said transfer loop in a first diverting orientation and alternately in a second diverting orientation;
(i) said first diverting orientation having a portion of said transfer loop engaging said powered roller uppermost edge portion and a portion of said transfer loop engaging said idler roller lowermost edge portion; said first diverting orientation enabling said transfer loop to be diverted in said first diverting direction; and
(ii) said second diverting orientation having a portion of said transfer loop engaging said powered roller lowermost edge portion and a portion of said transfer loop engaging said idler roller uppermost edge portion; said second diverting orientation enabling said transfer loop to be driven in said second diverting direction.

9. A diverter assembly for use with a line-shaft powered conveyor to divert objects from a transfer surface of the conveyor, said diverter assembly comprising:
(a) a stationary frame portion and a frame lift portion;
(b) diverter means mounted in said frame lift portion;
(c) a powered drive wheel mounted on the conveyor line-shaft;
(d) a power transfer wheel mounted in said frame lift portion;
(e) a drive loop mounted on said powered drive wheel to transfer rotational force from said powered drive wheel to said power transfer wheel to rotate same;
(f) drive means transferring power from said transfer wheel to said diverter means to power same from power derived from said powered drive wheel;
(g) said frame lift portion being mounted on said stationary frame portion for permitting vertical movement between a first, recessed position and a second diverting position;
(i) said first position having said diverter means oriented with an upper engagement portion thereof recessed below the transfer surface of the conveyor and out of potential diverting engagement with objects on the conveyor transfer surface;
(ii) said second position having said upper engagement portion of said diverter means raised above the transfer surface of the conveyor for selected diverting engagement with an object thereon; and
(h) lift means for selectively moving said frame lift portion between said first and second positions;
(i) said lift means including arc movement means providing that movement of said frame lift portion occurs along a substantially arcuate path while maintaining a substantially constant distance between said powered drive wheel and said power transfer wheel during arcuate movement;
(i) whereby an object upon the conveyor transfer surface may be selectively diverted by actuation of said lift means to lift said diverter means into engagement with the object; the object, once engaged, being selectively diverted by means of power derived from said powered drive wheel.

10. A diverter assembly according to claim 9 wherein:
(a) said lift means includes at least first and second link members;
(i) said first link member being rotatably mounted in said stationary frame portion for pivoting about a first pivot point and having a horizontal extension portion, said first link member horizontal extension portion pivotally engaging said frame lift portion; said first link member having a vertical extension portion;
(ii) said second link member being rotatably mounted in said stationary frame portion for pivoting about a second pivot point laterally spaced from said first pivot point and having a horizontal extension portion; said second link member horizontal extension portion pivotally engaging said frame lift portion; said second link member having a vertical extension portion;
(b) said lift means includes actuating means engaging said first link member vertical extension portion and said second link member vertical extension portion to selectively, simultaneously, pivot said first and second link members;
(i) pivoting of said first and second link members selectively moving said frame lift portion between said first and second positions.

11. A diverter assembly according to claim 9 wherein:
(a) said diverter means including a plurality of diverter rollers having a transfer loop mounted thereon;
(i) at least one of said diverter rollers being a powered roller in cooperative engagement with said transfer wheel to be selectively rotationally driven when said transfer wheel is rotated;
(ii) said transfer loop being mounted in engagement with said powered roller to be driven when said powered roller is driven; and
(b) said transfer loop having an outer upper surface laterally movable as said transfer wheel is rotated;
(i) said outer upper surface being substantially horizontal and forming at least a portion of said diverter means upper engagement portion;
(c) whereby an object on the conveyor transfer surface may be selectively engaged by said transfer loop outer upper surface for lateral movement.

12. A diverter assembly according to claim 11 including:
(a) reversing means selectively enabling said transfer loop to be driven in a first diverting direction and also selectively enabling said transfer loop to be driven in a second opposite diverting direction;
(b) whereby said diverter assembly may be adjusted to selectively divert an object in a first direction or a second opposite direction.

13. A diverter assembly according to claim 12 wherein:
(a) said powered roller is substantially vertically oriented for rotation about a substantially horizontal axis;
(b) said drive means includes an idler roller spaced from said powered roller and rotatable about an axis generally parallel to said powered roller axis; and
(c) said transfer loop is selectively adjustable between a first diverting orientation and a second diverting orientation;
(i) said first diverting orientation having said transfer loop engaging said powered roller and idler roller for powering said transfer loop in said first diverting direction; and
(ii) said second diverting orientation having said transfer loop engaging said powered roller and idler roller for powering said transfer loop in said second diverting direction.

14. A diverter assembly for use with a conveyor to divert objects from a transfer surface of the conveyor; said diverter assembly comprising:
(a) a stationary frame portion and a frame lift portion;
(b) a diverter mechanism mounted in said frame lift portion; said diverter mechanism having a plurality of transfer loops mounted therein;
(c) a powered drive wheel mounted in said stationary frame portion;
(d) a power transfer wheel mounted in said frame lift portion;
(e) a drive loop;
(i) said drive loop being mounted on said powered drive wheel and said power transfer wheel to transfer rotational force derived from said powered drive wheel to said power transfer wheel to rotate same;
(f) a drive mechanism associated with each transfer loop for selectively transferring power from said transfer wheel to said transfer loops to selectively power same by means of from said powered drive wheel;
(g) said frame lift portions being mounted on said stationary frame portion for vertical movement between a first recessed position and a second diverting position;
(i) said first position having each transfer loop oriented with an upper engagement portion thereof recessed below the transfer surface of the conveyor and out of potential diverting engagement with objects on the conveyor transfer surface;
(ii) said second position having portions of each transfer loop oriented with said upper engagement positions raised above the transfer surface of the conveyor for selected diverting engagement with an object thereon; and
(h) lift means for selectively moving said frame lift portion between said first and second positions;
(i) said lift means including arc movement means providing that movement of said frame lift portion occurs along a substantially arcuate path while maintaining a substantially constant distance between said powered drive wheel and said power transfer wheel during arcuate movement;
(i) whereby an object upon the conveyor transfer surface may be selectively diverted by actuation of said lift means to lift at least one of said transfer loops into engagement with the object; the object, once engaged, being selectively diverted by means of power derived from said powered drive wheel.

15. A diverter assembly for use with a conveyor to divert objects from a transfer surface of the conveyor, said assembly comprising:
(a) a stationary frame;
(b) a lift frame;
(c) said lift frame being mounted on said stationary frame to move in an arc about at least one lift axis between a recessed nondivert position and an extended divert position;
(d) an extendible motor pivotally connected between said stationary frame and said lift frame to move said lift frame between said recessed position and said extended position;
(e) driven diverter means positioned on said lift frame and, in said extended position of said lift frame, engaging an article on the conveyor transfer surface to divert the article from the conveyor, said diverter means including a driven member rotating about a driven member axis;
(f) rotary diverter drive means positioned on said stationary frame to power said driven diverter means, said drive means rotating about a drive axis; means for moving said lift frame between said recessed nondivert position and said extended divert position while maintaining a substantially constant distance between said drive axis and said driven member axis; and
(g) a drive loop drivingly engaged between said drive means and said driven member of said diverter means.

16. An assembly as set forth in claim 15 wherein:

(a) said diverter rive means is a line-shaft of a line-shaft conveyor.

17. An assembly as set forth in claim 15 wherein said driven diverter means includes:
   (a) a plurality of diverter support rollers rotatably mounted in spaced relation along aid lift frame;
   (b) an endless transfer loop trained about said support rollers;
   (c) a power transfer roller operatively engaging said transfer loop to propel said transfer loop upon the rotation of said power transfer roller; and
   (d) said drive loop drivingly engaging said power transfer roller to rotate said power transfer roller.

18. An assembly as set forth in claim 17 including:
   (a) a plurality of lift frames connected in spaced apart relation to move in unison;
   (b) each of said lift frames having said driven diverter means operatively mounted thereon;
   (c) each diverter means including said driven member being a respective power transfer roller;
   (d) a power transfer shaft having each power transfer roller affixed thereto; and
   (e) said drive loop drivingly engaging said power transfer shaft to rotate said shaft and thereby rotate the power transfer rollers.

19. An assembly as set forth in claim 15 including:
   (a) reversing means associated with said diverter means to selectively enable said diverter means to divert articles in a first direction and in an opposite second direction.

* * * * *